US008812342B2

(12) United States Patent
Barcelo et al.

(10) Patent No.: US 8,812,342 B2
(45) Date of Patent: Aug. 19, 2014

(54) MANAGING AND MONITORING CONTINUOUS IMPROVEMENT IN DETECTION OF COMPLIANCE VIOLATIONS

(75) Inventors: Fernando Barcelo, Corona, CA (US); Dennis R. Doll, Newport Beach, CA (US); Bassam H. Hassoun, Riverside, CA (US); Brian R. Matthiesen, Rancho Santa Margarita, CA (US); Jedd Weise, Laguna Niguel, CA (US); John B. Young, Irvine, CA (US)

(73) Assignee: International Business Machines Corporation, Armonk, NY (US)

( * ) Notice: Subject to any disclaimer, the term of this patent is extended or adjusted under 35 U.S.C. 154(b) by 438 days.

(21) Appl. No.: 12/815,948

(22) Filed: Jun. 15, 2010

(65) Prior Publication Data
US 2011/0307957 A1    Dec. 15, 2011

(51) Int. Cl.
*G06Q 10/00* (2012.01)
*G06Q 40/00* (2012.01)

(52) U.S. Cl.
USPC ........................................................ 705/7.28

(58) Field of Classification Search
USPC ............................................... 705/7.11–7.42
See application file for complete search history.

(56) References Cited

U.S. PATENT DOCUMENTS

| | | | |
|---|---|---|---|
| 7,523,053 B2 | 4/2009 | Pudhukottai et al. | |
| 7,813,944 B1 * | 10/2010 | Luk et al. | 705/4 |
| 8,499,330 B1 * | 7/2013 | Albisu et al. | 726/1 |
| 2002/0065780 A1 * | 5/2002 | Barritz et al. | 705/59 |
| 2002/0104014 A1 * | 8/2002 | Zobel et al. | 713/200 |
| 2004/0177326 A1 * | 9/2004 | Bibko et al. | 715/530 |
| 2005/0257267 A1 * | 11/2005 | Williams et al. | 726/25 |
| 2006/0074739 A1 | 4/2006 | King et al. | |
| 2006/0241991 A1 * | 10/2006 | Pudhukottai et al. | 705/8 |
| 2006/0248084 A1 * | 11/2006 | Sack et al. | 707/9 |
| 2007/0156495 A1 | 7/2007 | King | |
| 2007/0250935 A1 * | 10/2007 | Zobel et al. | 726/26 |

(Continued)

OTHER PUBLICATIONS

IBM "Tivoli Federated Identity Manager 6.1.1.—Auditing Guide" (Nov. 2006).*

(Continued)

*Primary Examiner* — Sujay Koneru
(74) *Attorney, Agent, or Firm* — Yee & Associates, P.C.; Jeffrey S. LaBaw

(57) ABSTRACT

A computer implemented method, data processing system, and computer program product is provided for using compliance violation risk data about an entity to enable an identity management system to dynamically adjust the frequency in which the identity management system performs a reconciliation and compliance check of an identity account associated with the entity. Data associated with an identity account is collected, wherein the data comprises at least one of compliance data, prior compliance violations, or personal data about an entity associated with the identity account. One or more risk factors for the identity account based on the collected data are determined. A risk score of the identity account is calculated based on the determined risk factors. The identity account is then audited with a frequency according to the risk score assigned to the identity account.

25 Claims, 6 Drawing Sheets

(56) References Cited

U.S. PATENT DOCUMENTS

| | | |
|---|---|---|
| 2008/0033776 A1* | 2/2008 | Marchese .......................... 705/8 |
| 2008/0047016 A1* | 2/2008 | Spoonamore ................... 726/25 |
| 2008/0162338 A1* | 7/2008 | Samuels et al. ................. 705/38 |
| 2008/0172412 A1* | 7/2008 | Gruhl et al. ................. 707/104.1 |
| 2008/0288330 A1* | 11/2008 | Hildebrand et al. ............ 705/10 |
| 2009/0287713 A1* | 11/2009 | Anderson et al. ............... 707/10 |
| 2009/0292632 A1* | 11/2009 | Dheer et al. .................... 705/35 |
| 2009/0313373 A1* | 12/2009 | Hanna et al. .................. 709/225 |
| 2010/0057493 A1* | 3/2010 | Heckelman ....................... 705/2 |
| 2010/0114634 A1* | 5/2010 | Christiansen et al. ............ 705/7 |
| 2010/0324952 A1* | 12/2010 | Bastos et al. ...................... 705/7 |

OTHER PUBLICATIONS

IBM "Tivoli Identity Manager 4.6—Planning for Deployment Guide" (Jun. 2005).*

Clark et al. "Employers Use of Social Networking Sites: a Socially Irresponible Practice" (Sep. 2010) Journal of Business Ethics, vol. 95, Issue 4, pp. 507-525.*

* cited by examiner

602 — RiskScore = 60 − (0*3) = 60    WorkerRating1 is low risk working anywhere
604 — RiskScore = 60 − (5*3) = 75    WorkerRating2 is medium risk - OK to check email from an internet cafe
606 — RiskScore = 60 − (15*3) = 105   WorkerRating3 is high risk - should be working from the office daily
608 — RiskScore = 60 − (40*3) = 180   WorkerRating4 is extremely high risk - should be closely monitored

MANAGING AND MONITORING CONTINUOUS IMPROVEMENT IN DETECTION OF COMPLIANCE VIOLATIONS

BACKGROUND

1. Field

The disclosure relates generally to an improved data processing system, and more specifically to managing and monitoring continuous improvement in detection of compliance violations. In particular, the disclosure provides a method and system for using compliance violation risk data about an entity to enable an identity management system to dynamically adjust the frequency in which the identity management system performs a compliance check of an identity account associated with the entity.

2. Description of the Related Art

Identity management (IdM) is a broad administrative area that deals with identifying individuals in a system (such as a country, a network, or an organization) and controlling access to resources in that system by placing restrictions or permissions on the established identities of the individuals. An identity manager is a management system which is used to provide centralized management of identity accounts. One example of an identity management system is Tivoli Identity Manager (TIM), which is a product of International Business Machines Corporation. Identity management systems fall within a product category known as GRC (governance, risk management, and compliance) software. Within a GRC product, governance describes the overall management approach through which executives direct and control an organization, risk management describes a set of processes through which management identifies, analyzes, and responds appropriately to risks that might adversely affect realization of the organization's business objectives, and compliance refers to conforming to stated requirements or policies of the organization or other obligations.

An entity in identity management may be a user, a group of users, or a device requesting access to one or more devices, data, or other elements of an organization. An entity may be represented in an identity management system as having one or more identities, or identity accounts. The process of using an identity management system to add identities, along with the entities' credentials and entitlements, in the network or computer systems under the control of the identity management system is called "provisioning". For example, when a person joins an organization as an employee, information that describes the employee may be provisioned into various components of the organization, such as a human resource system, an email system, a payroll system, a finance system, application directories, and so on. It is from these components that additional information that describes the employee's entitlements or rights to access resources within the organization is created by the identity management system. For example, the identity management system may use the employee's job title (e.g., accountant) to provide membership within a particular group (e.g., payroll). Similarly, the identity management system may also enforce a policy to prevent non-finance employees from being provisioned for membership within the payroll group.

The process of auditing the provisioning of the identity management system and verifying the validity of identity accounts is called a "reconciliation". In the reconciliation process, a compliance check is performed to verify that the identity accounts contain the restrictions and permissions defined in the policy and that the identity accounts match to appropriate end users and retire accounts that no longer do (e.g., where a user has left the organization), thereby ensuring that entitlements are appropriately provisioned to an identity account based on policies of the company. For example, a security policy may specify that only persons in the information technology (IT) department may have Microsoft® Active Directory identity accounts in an "administrators" group. When the reconciliation is run and the compliance check is performed, any accounts for persons outside the IT department will be flagged as security violations and the reconciliation process will optionally bring the account back into compliance by removing the administrator group from the account, flag the account as non-compliant with the policy, or disable the account.

SUMMARY

According to one embodiment of the present disclosure, a computer implemented method, data processing system, and computer program product is provided for using compliance violation risk data about an entity to enable an identity management system to dynamically adjust the frequency in which the identity management system performs a reconciliation and compliance check of an identity account associated with the entity. By using a risk heuristic to dynamically adjust the frequency that each account will be compliance checked, the reconciliation processes fewer accounts and increases the efficiency in which it detects non-compliant accounts.

The illustrative embodiments are implemented in a distributed computing environment in which a plurality of entities has identity accounts which allow access to protected resources in the environment. The illustrative embodiments collect data associated with an identity account in a plurality of identity accounts, wherein the data comprises at least one of compliance data, prior compliance violations, or personal data about an entity associated with the identity account. One or more risk factors for the identity account based on the collected data are determined. The illustrative embodiments then calculate a risk score of the identity account based on the determined risk factors. The identity account may then be audited with a frequency according to the risk score assigned to the identity account.

DETAILED DESCRIPTION

Figures 1, 5:
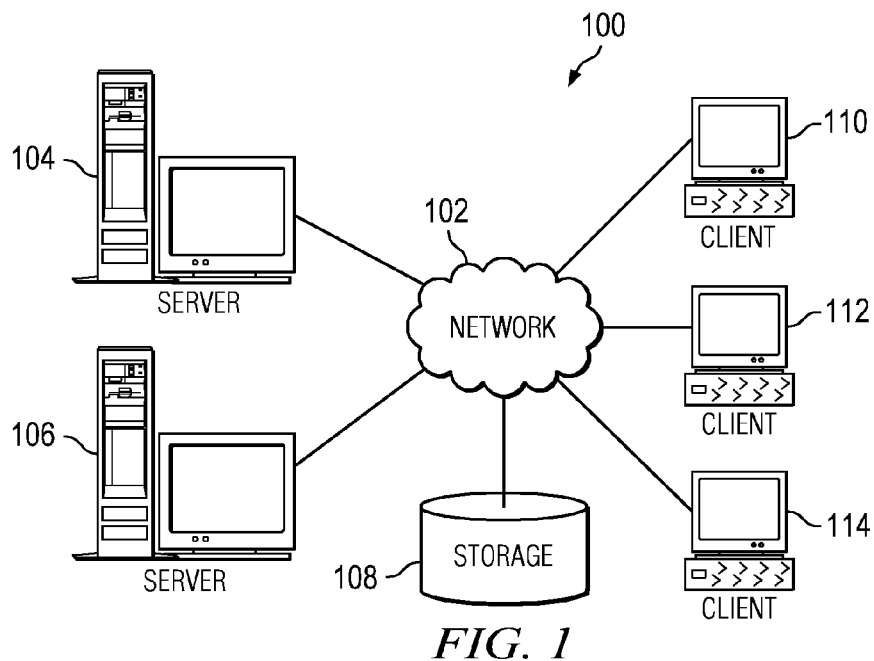
FIG. 1 depicts a pictorial representation of a distributed data processing system in which the illustrative embodiments may be implemented.
FIG. 5 illustrates an example of a risk heuristic that defines rules for combining risk data in accordance with the illustrative embodiments.

As will be appreciated by one skilled in the art, the disclosure may be embodied as a system, method or computer program product. Accordingly, the disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the disclosure may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electro-magnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device.

Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the embodiments of the disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The aspects of the disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

With reference now to the figures and in particular with reference to FIG. 1, an illustrative diagram of a data processing environment is provided in which illustrative embodiments may be implemented. It should be appreciated that FIG. 1 is only provided as an illustration of one implementation and is not intended to imply any limitation with regard to the environments in which different embodiments may be implemented. Many modifications to the depicted environments may be made.

FIG. 1 depicts a pictorial representation of a distributed data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers 110, 112, and 114 connect to network 102. Client computers 110, 112, and 114 may be, for example, personal computers or network computers. In the depicted example, server computer 104 provides information, such as boot files, operating system images, and applications to client computers 110, 112, and 114. Client computers 110, 112, and 114 are clients to server computer 104 in this example. Network data processing system 100 may include additional server computers, client computers, and other devices not shown.

Program code located in network data processing system 100 may be stored on a computer recordable storage medium and downloaded to a data processing system or other device for use. For example, program code may be stored on a computer recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

Figure 2:
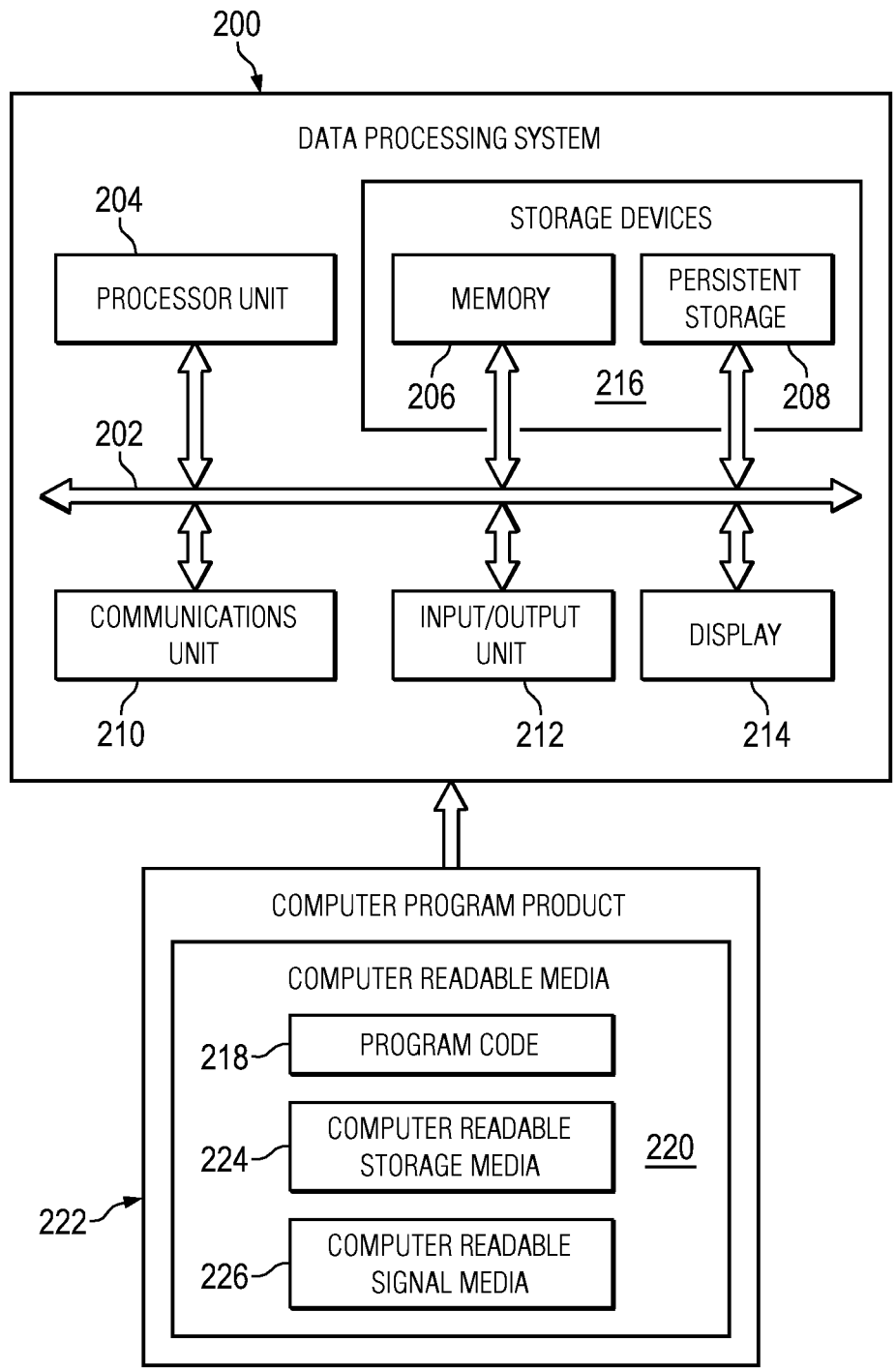
FIG. 2 is a block diagram of a data processing system in which the illustrative embodiments may be implemented.

Turning now to FIG. 2, a block diagram of a data processing system is depicted in accordance with an advantageous embodiment. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a number of processors, a multi-processor core, or some other type of processor, depending on the particular implementation. A number, as used herein with reference to an item, means one or more items. Further, processor unit 204 may be implemented using a number of heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information on either a temporary basis and/or a permanent basis. Memory 206, in these examples, may be, for example, a random access memory or any other suitable volatile or non-volatile storage device. Persistent storage 208 may take various forms, depending on the particular implementation.

For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or computer readable storage media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be computer readable storage media 224 or computer readable signal media 226. Computer readable storage media 224 may include, for example, an optical or magnetic disk that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory, that is connected to data processing system 200. In some instances, computer readable storage media 224 may not be removable from data processing system 200. In these illustrative examples, computer readable storage media 224 is a non-transitory computer readable storage medium.

Alternatively, program code 218 may be transferred to data processing system 200 using computer readable signal media 226, Computer readable signal media 226 may be, for example, a propagated data signal containing program code 218. For example, computer readable signal media 226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 218 may be downloaded over a network to persistent storage 208 from another device or data processing system through computer readable signal media 226 for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different advantageous embodiments may be implemented in a data processing system including components in addition to or in place of those illustrated for data processing system 200. Other components shown in FIG. 2 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206, or a cache such as found in an interface and memory controller hub that may be present in communications fabric 202.

The fundamental compliance auditing mechanism of identity management systems is the process of reconciliation. As previously mentioned, reconciliation is used to verify the validity and compliance of identity accounts in an organization against the policies of the organization. These policies may include any guidelines that affect an organization's objectives, operations, and plans, including security policies. An identity account may be determined to be a valid, compliant account (i.e., no violations) if the entitlements (i.e., group and role memberships) to the identity account are determined to be appropriately provisioned to the account. An identity account may be determined to be a non-compliant account if the entitlements to the identity account do not conform to stated requirements or policies of the organization or other defined obligations. Consider the scenario of an organization that comprises various technology services and associated users, groups, and access rights. Over time, employees may be hired or leave the organization, as well as shift from group to group within the organization. Consequently, the access rights associated with the identity accounts of the employees can become less and less synchronized with their actual business roles and with the requirements of the organization. In some instances, employees who have left the organization may still have access rights to resources in the organization. Reconciliation allows an identity management system to detect access policy violations and repair them where appropriate.

However, the reconciliation processes in existing identity management systems are flawed in several significant ways. For example, current reconciliation mechanisms can be very inefficient. The reconciliation process may sift through millions of compliant identity accounts and only locate a small percentage of accounts that have generated a compliance violation. This inefficiency increases hardware requirements, thereby increasing the costs to implement the identity management system. In addition, current reconciliation mechanisms are lacking in that they do not provide ways to improve the efficiency of the compliance checking process by detecting access rights compliance violations more effectively. Reconciliations never run faster or improve their percentage of compliance violations caught; they simply reprocess the same account data in the same manner for each audit cycle.

Furthermore, current reconciliation mechanisms treat all identity accounts as if each account has the same risk of generating a compliance violation. Current reconciliation mechanisms have no concept of return on investment (ROI), wherein the reconciliations would validate risky, high-privilege identity accounts more frequently than low privilege accounts, thereby saving CPU costs.

Identity management systems have attempted to address the issues above in various ways. Some identity management products approach the efficiency issues as if the issues are simply a scheduling problem. In this case, the identity management systems segment the identity accounts in the organization creating "filtered reconciliations" based on identity account attributes. These filtered reconciliation processes may be run more frequently for some filters, and less frequently for others. While the identity management systems break down the identity account population into smaller units to run on different reconciliation schedules, current reconciliation mechanisms do not provide a heuristic to improve the efficiency of the reconciliation process and thereby detect compliance violations more effectively. For example, there is no ability in existing identity management systems to automatically factor in and include prior compliance violations for each reconciliation processing run. In another example, while some identity management products create a recertification schedule for revalidating entitlements provisioned to identity accounts (recertification is the process of maintaining the validity of accounts and their associated access rights by requiring relevant organizational managers to approve of current account/privileges for employees on a periodic basis), these identity management products are also lacking in that the reconciliation mechanisms treat all user identity accounts as if they all have an equal compliance violation risk rating. Thus, while existing identity management systems provide filtered reconciliations that can create static risk groups, no system currently exists that uses the risk that an individual identity account may become a non-compliant account to dynamically drive how often the reconciliation process will be performed by the identity management system for the identity account.

The illustrative embodiments provide a solution to the limitations of existing identity management products by providing an improved reconciliation and compliance auditing mechanism that uses compliance violation risk data to dynamically update and drive how often (i.e., frequency) the reconciliation process will be performed by the identity management system on an individual identity account. The frequency in which the reconciliation process is performed may be automatically adjusted over time based on the compliance risk posed by the identity account. The illustrative embodiments may be implemented in a distributed computing environment in which a plurality of entities (e.g., users, devices) is associated with one or more identity accounts in an identity management system that allow access to protected resources in the environment. The identity management system monitors identity accounts in the organization and determines a set of compliance violation risk factor values relevant to each account based on data collected about the account or the entity associated with the account. Information about the account may include compliance data or historical compliance violation data, among others. Compliance data comprises information on W7 events that describe the "who," "what," and "where" type events in the network or computer systems that may represent risk factors, such as accessing sensitive payroll systems via an external VPN connection (e.g., accessing payroll systems while logged in from a home computer). Historical compliance violation data comprises information within the identity management system that represents a record of previous dates on which violations of the policy were found and the type of the violation (e.g., on May $5^{th}$ an account was found to be a member of the "administrators" group when a security policy forbids membership to that group). Information about the entity associated with the account may include human resources data, including personnel records, or social media data such as a Facebook or MySpace "friend" relationship to a person or entity with known policy violations. The identity management system uses a defined risk heuristic to calculate a compliance violation risk score for each account based on the determined compliance violation risk factors. The identity management system may then perform a reconciliation (compliance audit) of the account with a frequency according to the risk score calculated for the account.

By enabling the identity management system to dynamically adjust the frequency of the reconciliation process for individual identity accounts, the identity management system may ensure a maximum return on investment by identifying the largest percentage of compliance violations while using the minimum amount of computing resources. The illustrative embodiments allow the identity management system to monitor and identify the compliance violation risk of individual identity accounts in an organization, which is important to identify any breach in rights or violations of any policy in the organization. As identity accounts may move into or out of various compliance violation risk scenarios, the frequency in which the reconciliation process is performed on an individual identity account (or a group of identity accounts) is automatically adjusted without requiring human intervention. For example, based on the determined compliance violation risk of a set of identity accounts, a compliance audit may be performed on an account that is determined to be 'high risk' more frequently that an account that is determined to be a lower risk. Thus, in an example scenario in which a disgruntled employee accesses the computer systems of an organization, the illustrative embodiments allow an identity management system to determine that the employee falls into a particular risk category and will subsequently adjust the frequency in which the reconciliation process is performed against the identity accounts associated with that employee. In this manner, the illustrative embodiments allow for combining risk-differentiating criteria with a dynamic evaluation of each identity account to reduce the workload on and resources required by the auditing system, while also increasing the efficiency at which future compliance violations of accounts may be detected.

Figure 3:
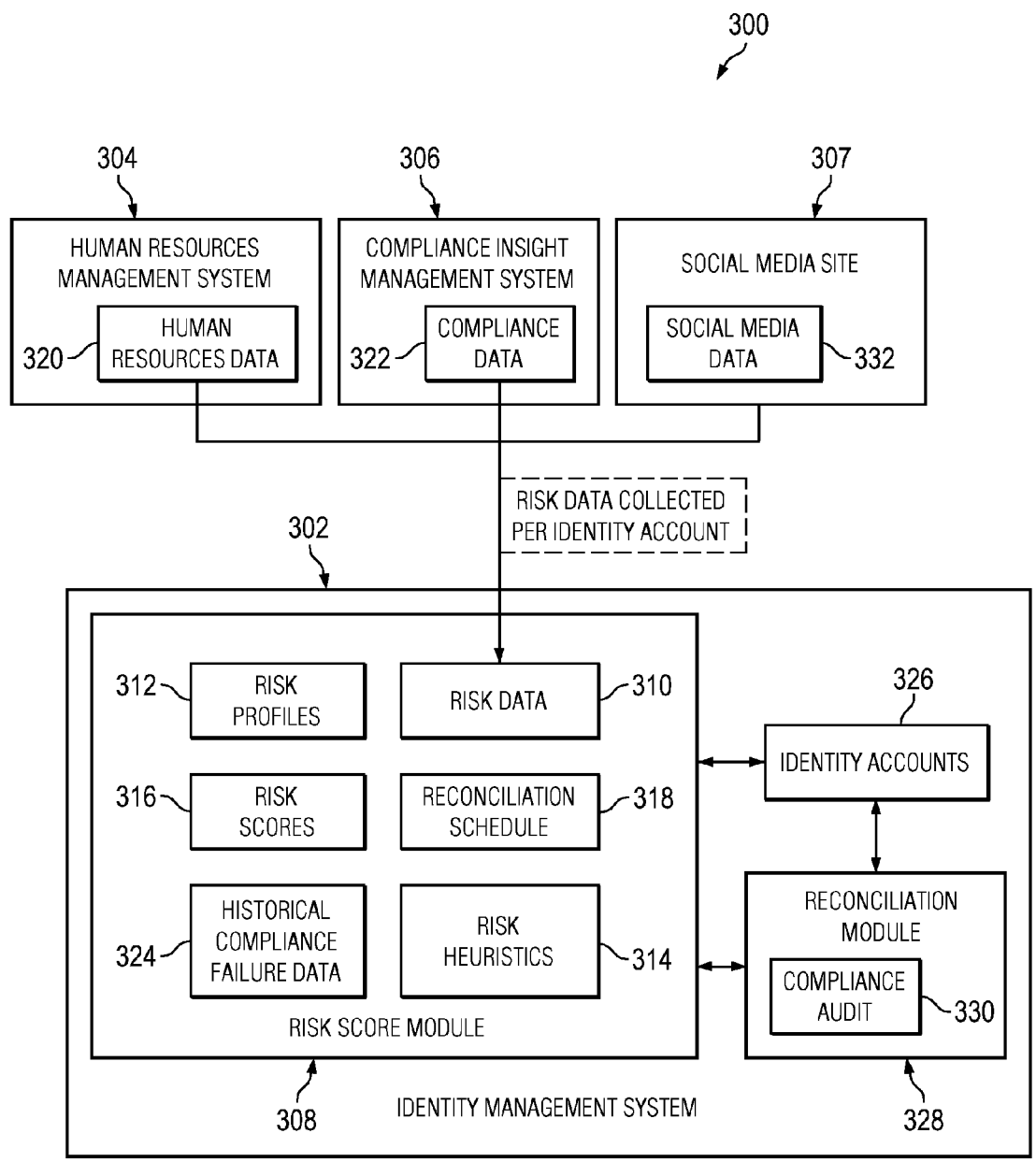
FIG. 3 is a block diagram of components in a data processing system with which the illustrative embodiments may be implemented.

FIG. 3 is a block diagram of components in a data processing system with which the illustrative embodiments may be implemented. In this illustrative example, data processing system 300 may be implemented as a server data processing system, such as server 104 or 106 in FIG. 1. Data processing system 300 is shown to comprise identity management system 302, human resources management system 304, compliance insight management (CIM) system 306, and social media site 307. However, it should be noted that data processing system 300 is only meant as an example and not intended as a limitation on different illustrative embodiments. In other words, data processing system 300 may include more or fewer components as necessary to accomplish processes of the different illustrative embodiments.

Identity management system 302 is an identity management product that automates user provisioning, identity administration, and password management to control the access to the resources in that system by placing restrictions on the established identities of users in an organization. In one embodiment, identity management system 302 comprises IBM® Tivoli® Identity Manager (TIM) which is a provisioning platform that centralizes and automates the lifecycle management of user's access rights on various end systems. Administrative users of the identity management system can provision user identities to many different systems, such as operating systems, data stores, and other applications.

In addition to traditional components present in known identity management systems, identity management system 302 is shown to include risk score module 308. Risk score module 308 provides a compliance reconciliation process heuristic that uses compliance violation risk data about individual identity accounts 326 to dynamically adjust the frequency in which reconciliation of individual identity accounts are performed by a reconciliation module in identity management system 302. Risk score module 308 collects data about individual users in an organization from various external sources, such as from identity management systems 302 with other components (e.g., human resources management system 304 and uses the risk-based heuristics to assign a risk score to each identity account 326. Data may be collected by risk score module 308 on a periodic basis. The risk score for an account determines the frequency in which the reconciliation process is to be performed on the account.

In this illustrative example, risk score module 308 comprises risk data 310, risk profiles 312, risk heuristics 314, risk scores 316, reconciliation schedule 318, and historical compliance failure data 324. Risk data 310 comprises data used by risk score module 308 to determine the risks individuals in an organization pose to the organization. For example, risk data 310 may comprise various types of information about an employee, such as human resources information comprising the employee's position or level in the organization, work performance reviews, life events affecting the employee, or other personal information. Risk data 310 may be obtained from one or more external sources. The external sources from which risk data 310 may be obtained may include, for example, human resources management system 304, compliance insight management system 306, and/or social media site 307.

Human resources management system 304 comprises administrative software that tracks existing entity (e.g., user or employee) human resources data 320, such as data in the form of personal histories, capabilities, skills, accomplishments, disciplinary actions received, performance reviews received, and salary, among other personnel data. Risk score module 308 may query and collect human resources data 320 for an identity account. The collected human resources data 320 may be stored as risk data 310 in risk score module 308 or in a datastore external to identity management system 302.

Compliance insight management system 306 comprises compliance software that monitors and audits activities performed by users in the organization in the context of policies and reports any compliance violations of the organization's policies. In one embodiment, compliance insight management system 306 comprises IBM® Tivoli® Compliance Insight Manager (TCIM) comprising automated user activity monitoring with dashboard and reporting to assist in managing security compliance, although other systems that collect log data for security policy compliance management may also be used. As identity management system 302 manages the provisioning of resources to identity accounts 326 in an organization, compliance insight management system 306 audits the provisioning done by identity management system 302 and audits events on the network and other systems within the organization.

In this illustrative example, compliance insight management system 306 comprises a risk data source, or compliance data 322. When compliance insight management system 306 collects and stores audit data from identity management system 302, compliance insight management system 306 may normalize the audit data using the W7 model to determine what event data was collected and report all compliance violations of the organization's security policies. Compliance data 322 may comprise audit data that is normalized in the W7 process by "translating" audit logs from identity management system 302 into security events in a consistent (normalized) manner. The normalized data within compliance data 322 comprises W7 attributes that represent the attributes of an event. These attributes may include "who," "what," "when," "where," "wherefrom," "whereto," among others. In other words, the normalized data may specify the user that initiated an event, the type of action the event represents, when the event occurred, what object was affected by the event, where the event originated, and the system targeted by the event. For example, compliance data 322 may comprise information about an event that indicates that a particular entity or user (who) initiates an event (what) from a particular location (where), such as an employee logging into the organization's payroll system (whereto) in the morning from a remote location, such as an Internet café or coffeehouse (wherefrom). Compliance data 322 may also comprise social media connections of each entity. As compliance data 322 may include event information from a large number of sources, not all audit data in compliance data 322 needs to be collected by risk score module 308 and copied to risk data 310.

Social media site 307 comprises one or more websites that provides information and allows a user to interact with the website. Examples of social media sites include, for example, weblogs or social networks such as Facebook or MySpace, and social media data 332 about the connections (e.g., 'friends' or followers) a user has in these social media may be used in determining a entity's risk of compliance with an organization's policies. For instance, an employee who has a social media connection to a disgruntled employee who has received poor performance reviews may be seen as having a higher risk of non-compliance with the organization's security policies than an employee who does not have a social media connection with such an individual. Identity management system 302 may monitor social media sites by using a programming API to build an application that reads the social media website and obtains the list of connections from the site.

Data at the external sources may be collected at either the person level or identity account level. For instance, human resources data 320 may comprise data collected at the person level, including data collected about each employee in an organization. Social media data 332 may also comprise data collected at the person level, including data collected about a particular user's social connections. Compliance data 322 may comprise data collected at the identity account level, including data regarding prior account violations. Thus, for risk data collected at the person level, risk score module 308 may use the collected risk data to determine the risk for all identity accounts associated with the particular person associated with the collected data. In contrast, for data collected at the identity account level, risk score module 308 may use the collected risk data to determine the risk for that same identity account.

Although particular examples of human resources data 320, compliance data 322, and social media data 332 are disclosed as providing risk data to identity management system 302, it should be noted that risk data may be obtained from any number of external sources and are not limited to the particular systems shown. The administrator may define many other types of data from other sources as relevant to assessing risks to the organization.

Historical compliance failure data 324 may comprise prior compliance violations for an entity. These compliance violations are a historical record of policy violations discovered during prior reconciliations and stored in identity management system 302. For instance, reconciliation module 328 may determine that compliance data 322 collected and used in a reconciliation indicates that the identity account being reconciled was, at some point, out of compliance with the organization's policies. In this situation, reconciliation module 328 records this violation in historical compliance failure data 324.

Risk profiles 312 in risk score module 308 may comprise a set of profiles (one or more) that define the risk of a compliance violation. Risk profiles 312 may be set up and defined by an administrator, who may later modify the profiles if the organization's policies change. In addition, risk profiles 312 (and associated risk criteria) may be created as new risks to the organization are identified, such as when a new type of activity is observed. A new profile may be created to monitor the activity to determine if the activity poses any risk to the organization. Each risk profile in risk profiles 312 comprises a specified risk criteria, data value, and risk factors associated with the data value. Risk criteria specifies the risk attributes that are to be monitored for each identity account for an organization, such as, for example, an employee's performance rating or remote work access. Data values are values collected for each identity account from various external data sources based on the risk criteria specified. These data values may be collected from data sources including human resources data 320, compliance data 322, social media data 332, and historical compliance failure data 324. Risk factors are risk values assigned to each data value specified in a risk profile. The higher a user's risk value for a given risk criteria, the higher the user's risk factor will be. For instance, a systems administrator has greater access to the organization's computer resources and network and may be deemed a higher compliance violation risk than, for example, a receptionist in the organization. An employee with low work performance reviews may be deemed a higher risk than an employee with an exemplary work rating. An employee with prior compliance violations is deemed a higher risk than employees that do not have any violations. An example of risk profiles 312 is further illustrated in FIG. 4.

Risk heuristics 314 may comprise a set of rules that combine the risk criteria in meaningful combinations that enable risk score module 308 to assess risk to an organization. Risk heuristics 314 may be set up and defined by an administrator, who may later modify the heuristics if the organization's policies change. The risk for an identity account may be expressed as a risk score. In a simple example, risk heuristics 314 may comprise a rule that specifies that the risk score comprises a sum all risk factors determined for an identity account, although other more complex heuristics may be used. An example of risk heuristics 314 is further illustrated in FIG. 5.

Risk scores 316 may comprise calculated values that represent the risk each identity account poses to the organization. Risk scores 316 may be calculated using risk heuristics 314. Risk scores 316 may be calculated by risk score module 308 at periodic intervals (e.g., once during the day), while the reconciliation process is performed at a later time (e.g., at night). Based on the results of the risk scores 316, identity management system 302 may subsequently perform the nightly reconciliation process that would include only those accounts whose risk score (and prior reconciliation date) warranted a compliance check in that reconciliation process.

Reconciliation schedule 318 in risk score module 308 comprises a schedule that specifies the frequency in which the reconciliation process is performed for a set of identity accounts based on the calculated risk score for each account. Reconciliation schedule 318 defines how often accounts having a particular risk score should be compliance checked. For example, based on the determined compliance violation risk of each identity account in a set of identity accounts, a compliance audit may be performed on the accounts that are deemed 'high risk' every 30 days, the accounts that are deemed 'medium risk' every 60 days, and the accounts that are deemed 'low risk' every 90 days. The content of reconciliation schedule 318 may set up and defined by an administrator, who may later modify the profiles if the organization's policies change. An example of reconciliation schedule 318 is further illustrated in FIG. 7.

Identity management system 302 is also shown to include reconciliation module 328. Reconciliation module 328 provides a compliance reconciliation engine that performs a compliance audit 330 of identity accounts 326 according to a frequency as specified by reconciliation schedule 318.

Although the illustrative example shows risk score module 308 collecting data about individual users in an organization from various external sources, such as from human resources management system 304, compliance insight management system 306, and/or social media site 307, it should be noted that the illustrative embodiments are not limited to such examples. In an alternative embodiment, the monitoring of identity accounts may be integrated into identity management system 302 such that the identity management system itself collects risk data about the identity accounts to determine the risks confronting a particular organization (e.g., security risks).

Figure 4:
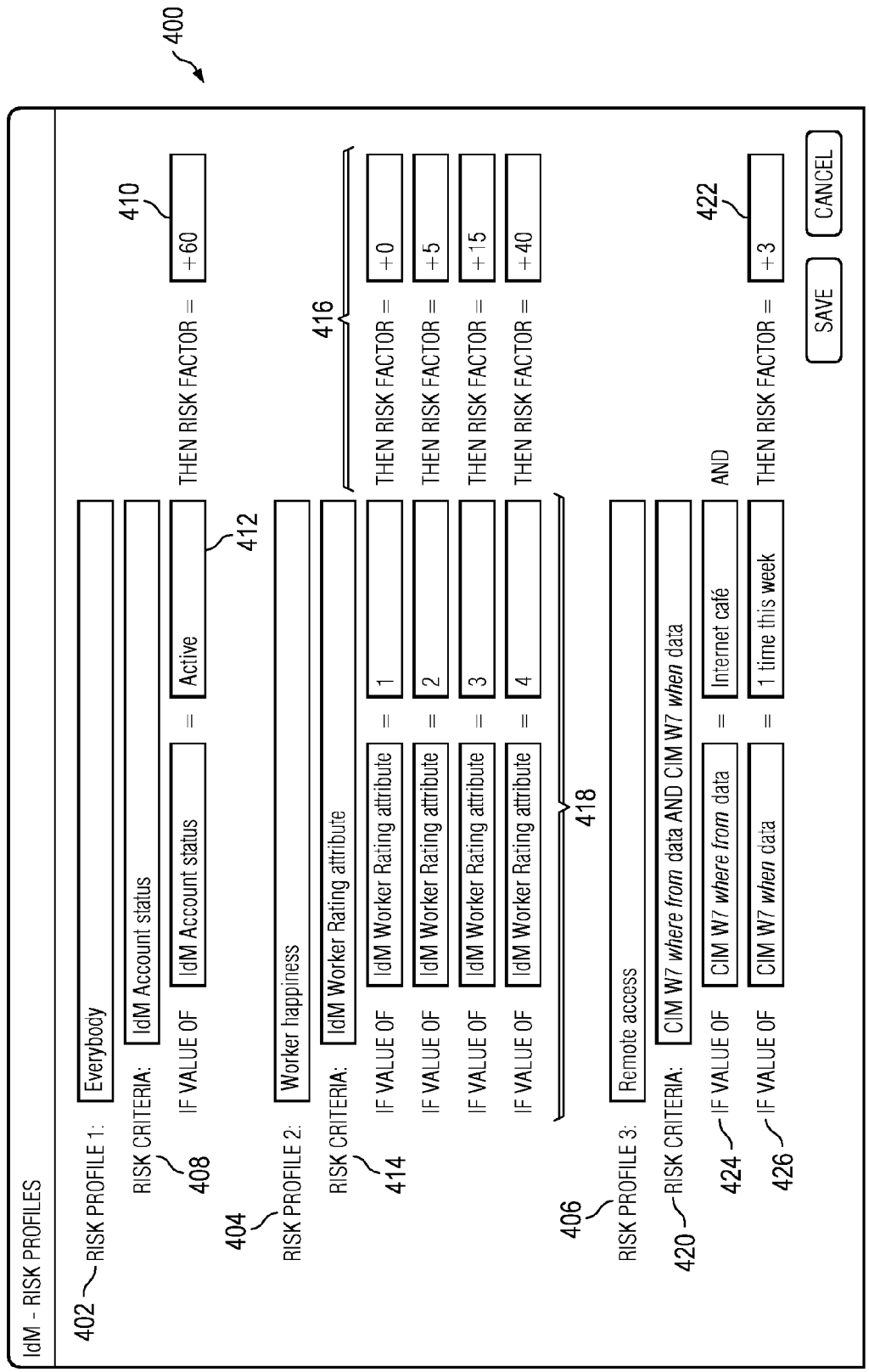
FIG. 4 illustrates an example of risk profiles that define risk criteria in accordance with the illustrative embodiments.

FIG. 4 illustrates an example of risk profiles that define risk criteria in accordance with the illustrative embodiments. Risk profiles are an example of risk profiles 312 in FIG. 3. Risk profile interface 400 is a graphical user interface for receiving risk profile information defined by an administrator. Risk profile information defined by an administrator may comprise any criteria deemed to be relevant for determining the risk an identity account or an entity associated with the identity account may pose to an organization. An administrator will initially define a set of risk profiles in advance. The risk profiles may subsequently be changed (including updating or removing existing profiles, or adding new profiles) to reflect changes in the policies of the organization. Thus, if a policy of the organization is changed, one or more risk profiles may also be changed to define risk criteria that accurately reflects the policies of the organization.

In this illustrative example, three risk profiles 402, 404, and 406 are shown. Each risk profile comprises a risk criteria, data value(s) for the risk criteria, and a risk factor associated with each data values. A risk profile is a collection of risk criteria, and a risk criteria is a meaningful category description of an aspect of the risk profile. For example, risk profile 1 402 is defined by an administrator as a risk evaluation regarding "everybody" in an organization. The risk criteria 408 in risk profile 1 402 is set as "IdM Account status". As an active identity account poses an increased security risk to an organization than an inactive identity account, risk profile 1 402 specifies that a risk factor 410 of +60 will be assigned to an individual identity account if the data value 412 of the account status for the identity account is "active".

Similarly, risk profile 2 404 is defined by the administrator as a risk evaluation regarding "worker happiness" in the organization. The risk criteria 414 in risk profile 2 404 is set as "IdM person Worker Rating attribute". Worker Rating is a value that reflects how an organization views the performance and commitment of an employee to the organization. In one embodiment, a low Worker Rating attribute indicates an employee is an excellent employee, while a high Worker Rating attribute indicates the employee is below average. In this example, multiple data values and associated risk factors are defined. For instance, a risk factor 416 of 0 will be assigned to an identity account if the data value 418 of the Worker Rating attribute for the identity account is "1". In contrast, if the data value 418 of the Worker Rating attribute for the identity account is "4", a risk factor 416 of +40 will be assigned to an identity account.

Risk profile 3 406 is defined by the administrator as a risk evaluation regarding "remote access" in the organization, such as when an employee accesses the computing systems of the organization via a remote location. The risk criteria 420 in risk profile 3 406 is set as "CIM W7 where from data" and "CIM W7 when data". CIM W7 "where from" and "when" information comprises data collected by compliance insight management system 306 in FIG. 3 through monitoring the usage of network accounts by users in the organization. For example, when a user logs on to the organization's computer network from a remote location, information about the connection is logged by compliance insight management system. This logged information may include where from, who, and when the connection was initiated, among other data. An employee with an identity account that accesses the computing resources of the organization at the office poses a lower security risk than an employee with an identity account that accesses the computing resource of the organization at a remote location. Different risk factors may be associated with different remote locations. As shown, a risk factor 422 of +3 will be assigned to an identity account if the combination of the "where from" data value 424 of the identity account is determined to be "Internet café" and the "when" data value 426 of the identity account is determined to be "1 time this week".

Although specific examples of risk profiles, risk criteria, and data values are illustrated, it should be noted that the illustrative embodiments are not limited to such examples, and any risk criteria and values may be defined and applied to the data collected from external data sources to determine the risks confronting a particular organization.

FIG. 5 illustrates an example of a risk heuristic that defines the rules for combining risk data in accordance with the illustrative embodiments. Risk heuristics are an example of risk heuristics 314 in FIG. 3. Risk heuristic interface 500 is a graphical user interface for receiving risk heuristic information defined by an administrator. An administrator may initially define the risk heuristics at a set up time.

Risk heuristics may comprise one or more rules that specify how the risk factors (determined for an identity account based on the risk criteria in the risk profiles) may be combined to calculate a risk score for the identity account. The risk heuristics may comprise simple mathematical operators and grouping for calculating a risk score. For example, the risk heuristic may comprise a rule that specifies that a sum of all risk factors applicable to the identity account is calculated to determine the risk score for the account. In this illustrative example, using the three risk profiles shown in FIG. 4, the risk heuristic may comprise a rule that specifies the risk score 502 for an identity account may be calculated as a product of the risk factor determined for worker happiness profile 404 times the risk factor determined for remote access profile 406, plus the risk factor determined for everybody profile 402 in FIG. 4.

Figures 6, 7:
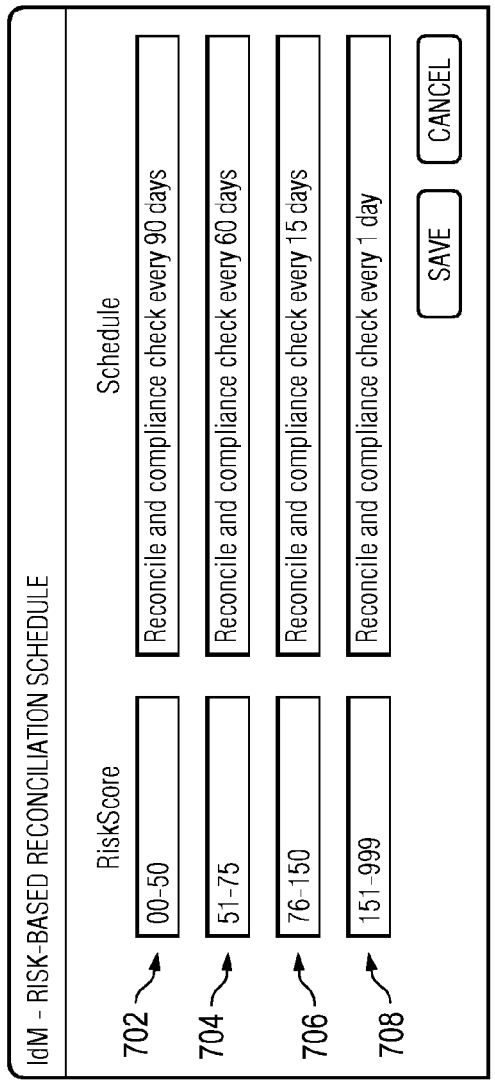
FIG. 6 illustrates an example of risk scores that may result from applying the risk heuristic to the risk data in accordance with the illustrative embodiments.
FIG. 7 illustrates a reconciliation schedule that defines the frequency of which an identity having a risk score are to be audited in accordance with the illustrative embodiments.

FIG. 6 illustrates an example of risk scores that may result from applying the risk heuristic to the risk data in accordance with the illustrative embodiments. Risk scores are an example of risk scores 316 in FIG. 3. Using the scenario described above, the risk scores are calculated from the applying the risk heuristics in FIG. 5 to the data values obtained from external data sources, such as human resources data 320 collected from human resources management system 304, compliance data 322 collected from compliance insight management system 306, social media data 332 collected from social media site 307, and/or historical account compliance failure data 324 collected from previous reconciliations and stored in risk score module 308 in FIG. 3. The risk scores illustrated in FIG. 6 show examples of combining the determined risk factors for an identity account using the mathematical operators in the risk heuristic, such as risk score 502 in FIG. 5. In the first example 602, a user having an active identity management account status (risk factor of 60), who has a worker rating of 1 (risk factor of 0), and who remotely accesses the organization's computer network from an Internet café once a week (risk factor of 3) will be assigned a risk score of 60. As shown, a risk score of 60 is deemed to be a low risk identity account. Consequently, the user associated with the account is determined to be low risk working at any location, such as in the office or at a café. In another example 604, a user having an active identity account in the organization (risk factor of 60), who has a worker rating of 2 (risk factor of 5), and who remotely accesses the organization's computer network from an Internet café once a week (risk factor of 3) will be assigned a risk score of 75. A risk score of 75 is deemed to be a medium risk identity account. The user associated with the medium risk identity account is deemed to be acceptable to check mail from, say, a café, but not to access other organization resources at that location or work from other locations than the office.

Example 606 shows a user having an active identity account in the organization (risk factor of 60), who has a worker rating of 3 (risk factor of 15), and who remotely accesses the organization's computer network from an Internet café once a week (risk factor of 3) will be assigned a risk score of 105. A risk score of 105 is deemed to be a high risk identity account. The high risk identity account is deemed to only be acceptable if the user is working at the office. Example 608 shows a user having an active identity account in the organization (risk factor of 60), who has a worker rating of 4 (risk factor of 40), and who remotely accesses the organization's computer network from an Internet café once a week (risk factor of 3) will be assigned a risk score of 180. A risk score of 180 is deemed to be an extremely high risk identity account. The extremely high risk identity account is deemed to need to be closely monitored, even within the office.

Although specific examples of risk scores calculated from a particular risk heuristic are illustrated, it should be noted that the illustrative embodiments are not limited to such examples, and any risk heuristic may be defined and used to determine the risks confronting a particular organization. The risk heuristic may include compliance data in combination with another factors, such as: account permissions (administrative accounts may be more risky than typical user accounts), number of accounts (user with hundreds of accounts may be more risky than users with one, or HR job title (an Executive's account may be able to access sensitive corporate data).

FIG. 7 illustrates a reconciliation schedule that defines the frequency of which an identity having a risk score is to be audited in accordance with the illustrative embodiments. Risk-based reconciliation schedule interface 700 is an example of reconciliation schedule 318 in FIG. 3. Risk-based reconciliation schedule interface 700 is a graphical user interface for receiving input by an administrator for scheduling when reconciliations by the identity management system should be performed based on the risk scores calculated for individual identity accounts. Risk-based reconciliation schedule information defined by an administrator may comprise any criteria deemed to be relevant for determining the risk a user associated with an identity account may pose to an organization. An administrator may initially define a set of risk profiles at a set up time.

In the illustrative example, the risk-based reconciliation schedule defines how often identity accounts having a particular risk score or that are within a range of risk scores are to be compliance checked. For example, identity accounts having risk scores of 50 or less are deemed as low risk accounts and thus will be compliance checked every 90 days 702, accounts having risk scores between 51-75 are deemed medium risk accounts and will be compliance checked every 60 days 704, accounts having risk scores between 76-150 are deemed high risk accounts and will be compliance checked every 15 days 706, and accounts having risk scores over 150 are deemed extremely high risk accounts and will be compliance checked every day 708. Thus, in the example scenario described, an employee with a worker rating 2 who occasionally logs on to the network to check mail from an Internet café is determined to be medium risk and would be compliance checked once each 60 days. However, if data obtained from the human resources system updates the employee's worker rating value to a 4, any remote access would immediately flag the worker as an extremely high risk account and trigger daily compliance checking of the employee's identity accounts.

Figure 8:
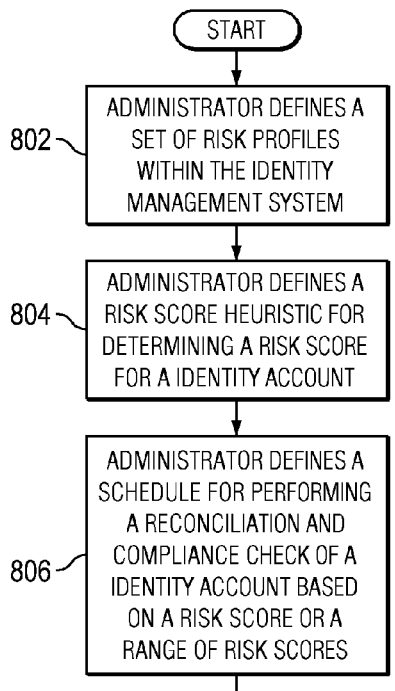
FIG. 8 is a flowchart of a process for defining risk criteria, heuristics, and reconciliation schedules in accordance with the illustrative embodiments.

FIG. 8 is a flowchart of a process for defining risk criteria, heuristics, and reconciliation schedules in accordance with the illustrative embodiments. The process described in FIG. 8 may be implemented by an administrator providing input into identity management system 302 in FIG. 3.

The process begins with an administrator defining a set of risk profiles within a graphical user interface of the identity management system (step 802). The risk profiles may be defined by the administrator specifying the desired risk criteria, the data values, and the risk factor associated with each data value, such as within risk profile interface 400 in FIG. 4. The administrator may then define a risk score heuristic for determining a risk score for an identity account (step 804). The risk score heuristic specifies a rule for calculating a risk score, such as, for example, risk score 502 in FIG. 5. A risk score is associated with each individual identity account. Once the heuristic is defined, the administrator may define a schedule for performing a reconciliation and compliance check of the identity accounts based on a set of risk scores or a range of risk scores (step 806). The reconciliation schedule specifies the frequency in which the identity management system will perform a reconciliation and compliance check of an identity account according to the risk score calculated for the account.

Figure 9:
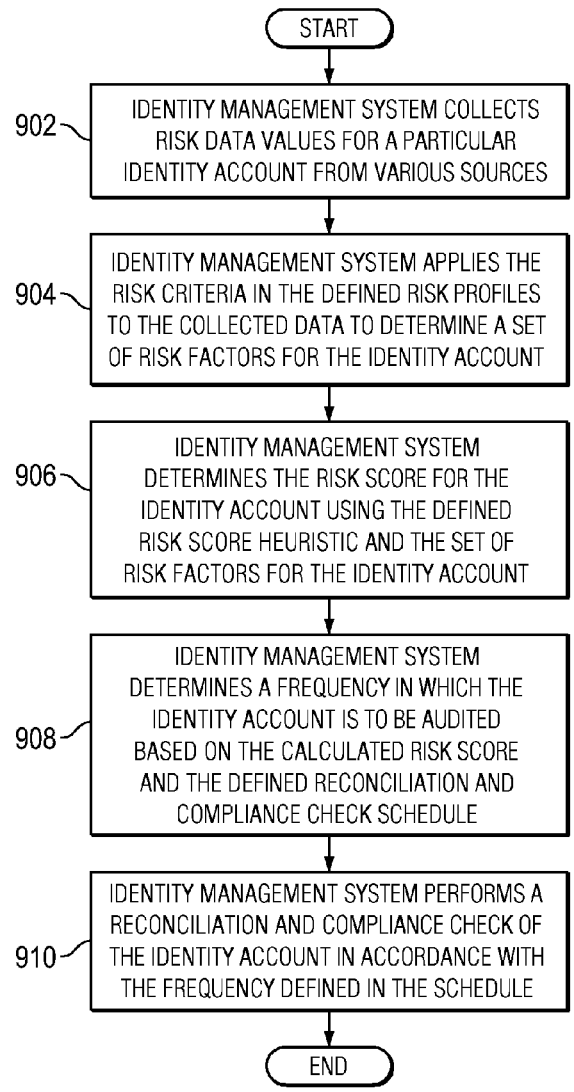
FIG. 9 is a flowchart of a process for monitoring and dynamically adjusting the frequency in which the identity management system performs a reconciliation and compliance check of an identity account based on the compliance violation risk of the entity associated with the account in accordance with the illustrative embodiments.

FIG. 9 is a flowchart of a process for monitoring and dynamically adjusting the frequency in which the identity management system performs a reconciliation and compliance check of an identity account based on the compliance violation risk of the entity associated with the account in accordance with the illustrative embodiments. The process described in FIG. 9 may be implemented by identity management system 302 in FIG. 3.

The process begins with the identity management system collecting risk data values associated with a particular identity account from various sources (step 902). The identity management system then applies the risk criteria in the defined risk profiles to the collected data to determine a set of risk factors for the identity account (step 904). The identity management system determines the risk score for the identity account using the defined risk score heuristic and the set of risk factors for the identity account (step 906). The identity management system then determines a frequency in which the identity account is to be audited based on the calculated risk score and the defined reconciliation and compliance check schedule (step 908). The identity management system performs a reconciliation and compliance check of the identity account in accordance with the frequency defined in the schedule (step 910).

The flowchart and block diagrams in the Figures illustrate the architecture, functionality, and operation of possible implementations of systems, methods and computer program products according to various embodiments of the disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the disclosure has been presented for purposes of illustration and description, but is not intended to be exhaustive or limited to the embodiments in the form disclosed. Many modifications and variations will be apparent to those of ordinary skill in the art without departing from the scope and spirit of the embodiments of the disclosure. The embodiments were chosen and described in order to best explain the principles of the disclosure and the practical application, and to enable others of ordinary skill in the art to understand the disclosure for various embodiments with various modifications as are suited to the particular use contemplated.

The disclosure can take the form of an entirely hardware embodiment, an entirely software embodiment or an embodiment containing both hardware and software elements. In a preferred embodiment, the disclosure is implemented in software, which includes but is not limited to firmware, resident software, microcode, etc.

Furthermore, the disclosure can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the disclosure has been presented for purposes of illustration and description, and is not intended to be exhaustive or limited to the disclosure in the form disclosed. Many modifications and variations will be apparent to those of ordinary skill in the art. The embodiment was chosen and described in order to best explain the principles of the disclosure, the practical application, and to enable others of ordinary skill in the art to understand the disclosure for various embodiments with various modifications as are suited to the particular use contemplated.

What is claimed is:

1. A method performed by a computer for auditing a distributed computing environment in which a plurality of user entities has identity accounts which allow access to protected resources in the environment, comprising:

by a processing unit in the computer, collecting data associated with an identity account in a plurality of identity accounts, wherein the data comprises personal data about an entity associated with the identity account and at least one of compliance data associated with at least one activity performed by a user entity associated with the identity account, or prior compliance violation data associated with the at least one activity performed by the user entity associated with the identity account;

determining a risk factor for the identity account based on the collected data;
calculating a risk score of the identity account based on the determined risk factor; and
auditing the identity account for compliance to a policy, wherein the identity account is audited with a respective frequency that is determined according to the risk score calculated for the identity account, wherein each of the plurality of identify accounts are audited at a respective frequency according to their own respective risk score calculated for their own respective identity account, wherein the personal data includes social media data that comprise connections or links to other entities with known prior compliance violations.

2. The method of claim 1, further comprising:
re-determining the risk factor at pre-defined time intervals;
assigning a new risk score to the identity account based on the re-determined risk factor; and
adjusting the frequency in which the identity account is audited according to the new risk score assigned to the identity account.

3. The method of claim 1, wherein the data comprises compliance data associated with at least one activity performed by a user entity associated with the identity account and personal data about the user entity associated with the identity account.

4. The method of claim 1, wherein the compliance data comprises event data in W7 format, wherein the event data specifies the user entity that initiated an event, a type of action the event represents, when the event occurred, what object was affected by the event, where the event originated, and a system targeted by the event.

5. The method of claim 1, wherein the prior compliance violation data comprises dates on which violations of the policy are detected and a description of the violations.

6. The method of claim 1, wherein determining a risk factor for an identity account further comprises:
defining a set of risk profiles comprising risk criteria, data values, and risk factors associated with the data values, wherein the risk criteria specifies risk attributes that are to be monitored for the identify account, the data values are values collected for the identity account from various external sources based on the risk criteria, and the risk factors are risk values assigned to each data value of the data values;
defining a risk score heuristic for calculating the risk score for a plurality of identity accounts, wherein the risk score heuristic comprises mathematical operators for combining the risk factors determined for each risk profile of the set of risk profiles to calculate the risk score for each of the identity accounts; and
defining a reconciliation schedule for performing the auditing of the identity accounts based on the risk score that is calculated for each of the identity accounts.

7. The method of claim 1, wherein determining a risk factor for the identity account further comprises:
applying risk criteria in a set of defined risk profiles to the collected data to determine the risk factors applicable to the identity account, wherein the risk criteria specifies risk attributes that are to be monitored for the identify account.

8. The method of claim 1, wherein calculating the risk score of the identity account comprises using a risk score heuristic comprising mathematical operators for combining the risk factors determined for each risk profile to calculate the risk score of the identity account.

9. The method of claim 1, wherein auditing the identity account for compliance to the policy further comprises:
locating the risk score in a reconciliation schedule; and
auditing the identity account with the frequency associated with the risk score in the reconciliation schedule.

10. The method of claim 7, wherein a given risk profile in the set of risk profiles comprises the risk criteria, at least one data value, and a risk factor associated with each of the at least one data value, wherein the risk criteria specifies risk attributes that are to be monitored for the identify account, the data values are values collected for the identity account from various external sources based on the risk criteria, and the risk factors are risk values assigned to each data value of the data values.

11. The method of claim 1, wherein the auditing step comprises a compliance check that verifies that the identity accounts contain restrictions and permissions defined in the policy and verifies that the identity accounts match to appropriate end-users.

12. The method of claim 1, wherein the step of collecting the data is performed at a first frequency and the step of auditing the identity account is performed at a second frequency that is different from the first frequency.

13. A data processing system for auditing a distributed computing environment in which a plurality of entities has identity accounts which allow access to protected resources in the environment, comprising:
a bus;
a storage device connected to the bus, wherein the storage device contains computer usable code; and
a processing unit connected to the bus, wherein the processing unit executes the computer usable code to collect data associated with an identity account in a plurality of identity accounts, wherein the data comprises personal data about an entity associated with the identity account and at least one of compliance data associated with at least one activity performed by a user entity associated with the identity account, or prior compliance violation data associated with the at least one activity performed by the user entity associated with the identity account; determine a risk factor for the identity account based on the collected data; calculate a risk score of the identity account based on the determined risk factor; and audit the identity account for compliance to a policy, wherein the identity account is audited with a respective frequency according to the risk score calculated for the identity account, wherein each of the plurality of identify accounts are audited at a respective frequency according to their own respective risk score calculated for their own respective identity account, wherein the personal data includes social media data that comprise connections or links to other entities with known prior compliance violations.

14. The data processing system of claim 13, wherein the program code to audit the identity account comprises program code to perform a compliance check that verifies that the identity accounts contain restrictions and permissions defined in the policy and verifies that the identity accounts match to appropriate end-users.

15. The data processing system of claim 13, wherein the data is collected at a first frequency and the identity account is audited at a second frequency that is different from the first frequency.

16. A computer program product for auditing a distributed computing environment in which a plurality of entities has identity accounts which allow access to protected resources in the environment, comprising:

a tangible computer readable storage device having computer readable program code stored thereon, the computer readable program code for execution by a computer, comprising:
computer readable program code for collecting data associated with an identity account in a plurality of identity accounts, wherein the data comprises personal data about an entity associated with the identity account and at least one of compliance data associated with at least one activity performed by a user entity associated with the identity account, or prior compliance violation data associated with the at least one activity performed by the user entity associated with the identity account;
computer readable program code for determining a risk factor for the identity account based on the collected data;
computer readable program code for calculating a risk score of the identity account based on the determined risk factor; and
computer readable program code for auditing the identity account for compliance to a policy, wherein the identity account is audited with a respective frequency according to the risk score calculated for the identity account, wherein each of the plurality of identify accounts are audited at a respective frequency according to their own respective risk score calculated for their own respective identity account, wherein the personal data includes social media data that comprise connections or links to other entities with known prior compliance violations.

17. The computer program product of claim 16, further comprising:
computer readable program code for re-determining the risk factor at pre-defined time intervals;
computer readable program code for assigning a new risk score to the identity account based on the re-determined risk factor; and
computer readable program code for adjusting the frequency in which the identity account is audited according to the new risk score assigned to the identity account.

18. The computer program product of claim 16, wherein the compliance data comprises event data in W7 format, wherein the event data specifies the user entity that initiated an event, a type of action the event represents, when the event occurred, what object was affected by the event, where the event originated, and a system targeted by the event.

19. The computer program product of claim 16, wherein the computer readable program code for determining a risk factor for an identity account further comprises:
computer readable program code for defining a set of risk profiles comprising risk criteria, data values, and risk factors associated with the data values, wherein the risk criteria specifies risk attributes that are to be monitored for the identify account, the data values are values collected for the identity account from various external sources based on the risk criteria, and the risk factors are risk values assigned to each data value of the data values;
computer readable program code for defining a risk score heuristic for calculating the risk score for a plurality of identity accounts, wherein the risk score heuristic comprises mathematical operators for combining the risk factors determined for each risk profile of the set of risk profiles to calculate the risk score for each of the identity accounts; and
computer readable program code for defining a reconciliation schedule for performing the auditing of the identity accounts based on the risk score that is calculated for each of the identity accounts.

20. The computer program product of claim 16, wherein the computer readable program code for determining a risk factor for the identity account further comprises computer readable program code for applying risk criteria in a set of defined risk profiles to the collected data to determine the risk factors applicable to the identity account, wherein the risk criteria specifies risk attributes that are to be monitored for the identify account, wherein the computer readable program code for calculating the risk score of the identity account further comprises computer readable program code for using a risk score heuristic comprising mathematical operators for combining the risk factors determined for each risk profile to calculate the risk score of the identity account, and wherein the computer readable program code for auditing the identity account for compliance to the policy further comprises computer readable program code for locating the risk score in a reconciliation schedule and auditing the identity account with the frequency associated with the risk score in the reconciliation schedule.

21. The computer program product of claim 16, wherein the computer readable program code is stored in a computer readable storage medium in a data processing system, and wherein the computer readable program code is downloaded over a network from a remote data processing system.

22. The computer program product of claim 16, wherein the computer readable program code is stored in a computer readable storage medium in a server data processing system, and wherein the computer readable program code is downloaded over a network from a remote data processing system for use in a computer readable storage medium with the remote system.

23. The computer program product of claim 16, wherein the computer readable program code for auditing the identity account comprises:
computer readable program code to perform a compliance check that verifies that the identity accounts contain restrictions and permissions defined in the policy and verifies that the identity accounts match to appropriate end-users.

24. The computer program product of claim 16, wherein the data is collected at a first frequency and the identity account is audited at a second frequency that is different from the first frequency.

25. A computer program product for auditing a distributed computing environment in which a plurality of entities has identity accounts which allow access to protected resources in the environment, comprising:
a tangible computer readable storage device having computer readable program code stored thereon, the computer readable program code for execution by a computer, comprising:
computer readable program code for collecting data associated with an identity account in a plurality of identity accounts, wherein the data comprises personal data about an entity associated with the identity account and at least one of compliance data, or prior compliance violation data;
computer readable program code for determining a risk factor for the identity account based on the collected data;
computer readable program code for calculating a risk score of the identity account based on the determined risk factor; and
computer readable program code for auditing the identity account for compliance to a policy, wherein the identity account is audited with a frequency according to the risk score calculated for the identity account, wherein the personal data includes human resources data or social media data, wherein the social media data comprises connections or links to other entities with known prior compliance violations.

* * * * *